US007277215B2

(12) United States Patent
Greer

(10) Patent No.: US 7,277,215 B2
(45) Date of Patent: Oct. 2, 2007

(54) CONTROL SYSTEM FOR ELECTROCHROMIC DEVICES

(75) Inventor: Bryan D. Greer, Northfield, MN (US)

(73) Assignee: Sage Electrochromics, Inc., Faribault, MN (US)

( * ) Notice: Subject to any disclaimer, the term of this patent is extended or adjusted under 35 U.S.C. 154(b) by 0 days.

(21) Appl. No.: 11/409,145

(22) Filed: Apr. 21, 2006

(65) Prior Publication Data

US 2006/0245024 A1    Nov. 2, 2006

Related U.S. Application Data

(62) Division of application No. 10/897,851, filed on Jul. 23, 2004, now Pat. No. 7,133,181.

(51) Int. Cl.
*G02F 1/15* (2006.01)
(52) U.S. Cl. ...................................... 359/265; 359/900
(58) Field of Classification Search ................ 359/265, 359/266, 267, 268, 269, 270, 271, 272, 273, 359/274, 275, 900; 345/105, 107
See application file for complete search history.

(56) References Cited

U.S. PATENT DOCUMENTS

| 4,972,176 A | 11/1990 | Vallance |
| 5,130,842 A | 7/1992 | Gauthier et al. |
| 5,231,531 A | 7/1993 | Defendini et al. |
| 5,365,365 A | 11/1994 | Ripoche et al. |
| 5,627,509 A | 5/1997 | Gajewski et al. |
| 5,648,758 A | 7/1997 | Tweadey, II et al. |
| 5,694,144 A * | 12/1997 | Lefrou et al. ............. 345/49 |
| 6,856,444 B2 | 2/2005 | Ingalls et al. |
| 2004/0001056 A1 | 1/2004 | Atherton et al. |

FOREIGN PATENT DOCUMENTS

| GB | 2 126 365 A | 3/1984 |
| WO | WO-03/054823 A | 7/2003 |

OTHER PUBLICATIONS

European Search Report, EP 05 02 5427, Dated, Feb. 21, 2006.
Inoue, "Electric equivalent curcuit in coloration process of ECD and the application for curcuit design", The Institution of Electrical Engineers, Stevenage, GB, Dec. 1992.
O'Brien et al, "Electrochromic coatings-applications and manufacturing issues", Thin Solic Films, Elsevier-Sequoia S.A. Lausanne, CH, vol. 34, No. 2, May 21, 1999, pp. 312-318.
Partial European Search Report, EP 05 01 2984, Dated: Oct. 4, 2005.

* cited by examiner

*Primary Examiner*—Ricky Mack
*Assistant Examiner*—Tuyen Tra
(74) *Attorney, Agent, or Firm*—Lerner, David, Littenberg, Krumholz & Mentlik, LLP

(57) ABSTRACT

A method of determining the transmission state of an electrochromic device includes applying a voltage across the electrochromic device, using the applied voltage and current for calculating leakage current of the electrochromic device and determining ionic current as the difference between the applied current and the leakage current. The method includes using the ionic current for determining the transmission state of the electrochromic device.

6 Claims, 11 Drawing Sheets

IMPLICIT VOC MEASUREMENT

CONTROL SYSTEM FOR ELECTROCHROMIC DEVICES

CROSS-REFERENCE TO RELATED APPLICATIONS

The present application is a divisional of commonly assigned U.S. patent application Ser. No. 10/897,851, filed Jul. 23, 2004, now U.S. Pat. No. 7,133,181 the disclosure of which is hereby incorporated by reference herein.

BACKGROUND OF THE INVENTION

The present invention generally relates to electrochromic devices and more particularly relates to control systems for electrochromic devices.

Electrochromic devices include electrochromic materials that change their optical properties in response to the application of an electric current or an electric potential. Electrochromic devices generally include a series of thin films that are deposited directly onto the surface of a transparent substrate, such as a conventional window made of glass or plastic. Electrochromic devices are typically incorporated into architectural and transportation window applications, display windows and cabinets, or any application requiring a changeable tinted glass. By selectively controlling the transmission of optical energy through these windows, particularly windows on buildings and vehicles, tremendous cost savings in terms of heating and cooling can be realized.

While a great deal of prior art exists to control electrochromic devices, very little of it is useful for controlling electrochromic devices with substantial electronic leakage current, including devices made with solid-state ion conductors. In addition, previous systems for electrically heating electrochromic devices require modifications to the easy to manufacture two-bus bar electrode arrangement. Finally, in situations where safe operating voltage depends on temperature, integrating temperature-measurement solutions can be difficult.

Most electrochromic devices that have been developed to date use polymeric electrolyte layers. Unfortunately, there are a number of disadvantages associated with polymeric devices. For example, polymeric devices have a significant weight and thickness and require two pieces of transparent substrate (e.g. glass) to be laminated together. In addition, the durability of the polymer approach for glazing applications is suspect due to the instability of polymer electrolyte layers when exposed to UV light and temperature.

It has recently been determined that the above problems can be avoided by replacing the polymeric electrolyte layers of electrochromic devices with solid state inorganic electrolyte layers. Electrochromic devices having solid state inorganic electrolytes are lighter and thinner than polymeric devices, and are more durable when exposed to UV light and temperature. However, the solid state inorganic electrolyte layers allow electronic leakage current through the electrolyte. This electronic leakage phenomenon may cause slower switching speed, longer switching times, and a slow loss of charge state when the device is being held in a steady state, which could lead to spontaneous coloration or bleaching depending on the electrochemical potentials within the device.

There have been a number of security devices incorporated into windows. U.S. Pat. No. 4,972,176 to Vallance discloses a polymeric security window with an integrated intrusion detector. The security window includes a laminated pair of polymeric panels having electrically conductive rods sandwiched therebetween. Glass fibers, having electrically conductive coatings, extend from edge to edge of the plastic window panels and are distributed in the rods, which substantially cover the entire window area. The index of refraction of the coated glass fibers is similar to that of the surrounding plastics, making the electrically conductive rods substantially invisible. The conductive rods are connected in series, and a current source provides a constant current through the circuit. The resistance of the circuit increases when a rod is severed, or punctured. A change in the magnitude of the voltage required to maintain constant current in the circuit indicates that a window panel and at least some of the glass fibers have been damaged.

U.S. Pat. No. 5,648,758 to Tweadey, II et al. discloses a pre-assembled glass breakage detector having a carrier substrate designed to carry an electrical circuit subassembly. The electrical circuit subassembly includes an electrically conductive fragile film and spaced electrical connectors. A method of making a glazing unit security system includes pre-assembling one or more such glass breakage detector appliqués and then applying the electrical subassembly thereof to the surface of a glazing pane, and connecting electrical needs from continuity lost detection circuitry to the electrical connectors. In a motor vehicle application, the appliqués can be applied to stationary and/or moveable vehicle windows, being especially advantageous for use on a hidden surface area of moveably mounted glazing panes. The fragile film loses electrical continuity upon disruption of the underlying glazing pane, when the pane is broken.

U.S. Pat. No. 5,627,509 to Gajewski et al. discloses a glazing unit security system having an electrically conductive strip of polymeric material adhered to the surface of a tempered glass pane. A security monitoring element electrically connected to the conductive strip senses and responds to a loss of electrical continuity of the conductive strip. The conductive strip is non-self-integral, such that it would not survive with electrically continuity a fracture of the underlying glass panel. Since a fracture of the tempered glass panel will result in overall fracturing of the panel, it would cause loss of electrical continuity of the conductive strip. The security system further includes an alarm or other device responsive to a loss of electrical continuity of the conductive strip. When installed in a motor vehicle, the security system may include disabling means to prevent normal operation of a motor vehicle in response to loss of electrical continuity of a conductive strip.

In spite of the above advances, there remains a need for a controller for an electrochromic device that incorporates security monitoring capabilities at little or no additional cost. There is also a need for a controller for an electrochromic device that can measure the temperature of the EC device without using additional components or external measuring instruments. There is also a need for a controller for an electrochromic device that is capable of operating the device at safe operating voltage levels, which may depend on the measured temperature. There is also a need for a controller for an electrochromic device that compensates for electronic leakage current, which may occur in devices having solid state ion conductors. There is also a need for a controller for an electrochromic device that enables the device to be heated without requiring an extra or distinct heating element. There also remains a need for a control system for an electrochromic device that is capable of monitoring the transmission state of the device and effectively controlling the transmission level of the device.

SUMMARY OF THE INVENTION

Preferred embodiments of the present invention provide a control system for an electrochromic (EC) device that is capable of monitoring the temperature of the EC device without requiring an external temperature monitoring element, and then controlling the EC device based, in part, upon the temperature readings. The control system also preferably provides methods for heating the EC device using current flowing through the device and for simultaneously heating and changing the transmissivity level of the device. The controller also provides security feedback by detecting glass breakage via an alternating current impedance measurement of the EC device. The controller also provides for methods of determining the bleaching/coloring history of the EC device, determining the transmission state of the EC device and applying a holding voltage to maintain the transmission state of the EC device.

At relatively high temperatures (e.g. 70 C), an electrochromic device may be damaged by voltages exceeding 2.5V. On the other hand, at relatively low temperatures (e.g., 0 C), higher voltages of approximately 4.0V are required to color an electrochromic device in a reasonable period of time. Thus, in order to effectively control an electrochromic device, it is critical to know the approximate temperature of the device. Preferred embodiments of the present invention provide control systems that use impedance measurements at one or more frequencies to establish device temperature. Although the present invention is not limited by any particular theory of operation, it has been determined that the level of ionic current flowing through a device varies significantly with temperature. This effect may be used to measure the temperature of an EC device without requiring the use of separate temperature sensors placed on the device.

In certain preferred embodiments, the present invention discloses a control system for an electrochromic device that is able to obtain temperature measurements for the device without requiring external temperature measuring instruments. The present invention also provides an electrochromic device whereby a controller operates the device at safe voltage levels dependent upon the measured temperature of the device.

In other preferred embodiments of the present invention, the controller may be used for heating an EC device. In one particular preferred embodiment, a method of heating an electrochromic (EC) device having a microprocessor, a driver in communication with the microprocessor and feedback circuitry in communication with both the driver and the microprocessor, includes applying at least five (5) volts to the EC device to produce a current flowing through the EC device in a direction, and while applying the at least five (5) volts, changing the direction of the current flowing through the EC device at at least 100 Hz, whereby power generated when the current is flowing through said EC device produces heat. In certain preferred embodiments, the microprocessor controls the device so that current flows in a first direction 50% of the time and in a second direction 50% of the time for heating the EC device. In other preferred embodiments, the microprocessor controls the device so that the current flows in a first direction over 50% of the time and in a second direction less than 50% of the time for both heating the EC device and changing the transmissivity level of the EC device.

In more preferred embodiments, the applying at least five (5) volts includes applying 12 or more volts. In more highly preferred embodiments, the applying at least five (5) volts includes applying 12-24 volts. In even more highly preferred embodiments, the applying at least five volts includes applying 12-24 volts at 1-10 kHz.

The driver may include a H-bridge circuit, such as a H-bridge circuit having at least four transistors. In certain preferred embodiments, the H-bridge circuit has at least four MOSFET transistors. A driver circuit may be associated with each MOSFET transistor.

Other preferred embodiments of the present invention provide a method of heating an electrochromic (EC) device without requiring a distinct heating element. The EC device preferably includes a microprocessor, a driver in communication with the microprocessor and feedback circuitry in communication with both the driver and the microprocessor. The method preferably includes applying at least 12 volts to the EC device to produce a current flowing through the EC device in a direction, and while applying the at least 12 volts, changing the direction of the current flowing through the EC device at 1-10 kHz, whereby power generated when the current is flowing through said EC device produces heating of the EC device. The feedback circuitry desirably provides voltage and current information to the microprocessor.

Another preferred embodiment of the present invention provides a method of simultaneously heating and changing the transmissivity level of an electrochromic (EC) device. The EC device desirably includes a microprocessor, a driver in communication with the microprocessor and feedback circuitry in communication with both the driver and the microprocessor. The method preferably includes applying at least five (5) volts to the EC device to produce a current flowing through the EC device in a direction, and while applying the at least five (5) volts, changing the direction of the current flowing through the EC device at at least 100 HZ, wherein power generated when the current is flowing through the EC device produces heat, and whereby the current flows in a first direction over 50% of the time and in a second direction less than 50% of the time for modifying the transmissivity level of the EC device. In more preferred embodiments, about 12-24 volts are applied at 1-10 kHz.

In other preferred embodiments of the present invention, the controller may be used for monitoring security of the EC device. In certain preferred embodiments, the controller provides security control feedback by detecting glass breakage via a high frequency impedance measurement of the EC device.

In accordance with particular preferred embodiments of the present invention, a method of monitoring security using an electrochromic device includes providing a substrate having a first surface, providing the electrochromic device over the substrate, monitoring at least one electrical characteristic of the electrochromic device, and generating an alarm signal when the at least one electrical characteristic of the electrochromic device falls outside a predetermined range. In certain preferred embodiments, the monitoring step includes measuring an impedance of the electrochromic device such as by applying an alternating voltage across the electrochromic device, and measuring the alternating current through the electrochromic device to measure the impedance.

In certain preferred embodiments, the alternating voltage is provided at a predetermined frequency so that the impedance of the electrochromic device is almost purely resistive. In certain preferred embodiments, the predetermined frequency of the alternating voltage is between approximately 0.1-100 KHz. In more preferred embodiments, the predetermined frequency of the alternating voltage is between approximately 1-10 KHz.

In yet other embodiments, the method of monitoring security using an electrochromic device includes applying a current through the electrochromic device and measuring the voltage across the electrochromic device to measure the impedance thereof.

In preferred embodiments, the substrate is a substantially transparent substrate such as a glass window pane. In other preferred embodiments, the electrochromic device is disposed between two glass window panes of an insulated glass unit. The electrochromic device may be a polymeric electrochromic device or a solid-state electrochromic device.

In preferred embodiments, the electrochromic device includes a first substantially transparent conductive film over the substrate, at least one electrochromic film over the first substantially transparent conductive film, and a second substantially transparent conductive film over the at least one electrochromic film.

In other preferred embodiments of the present invention, a method of monitoring security using an electrochromic device includes providing a substrate having a first surface, and providing the electrochromic device over the substrate, passing light through the electrochromic device, monitoring at least one optical characteristic of the light passing through the electrochromic device and generating an alarm signal when the at least one optical characteristic of the light passing through the electrochromic device falls outside a predetermined range. The monitoring at least one optical characteristic step preferably includes providing an optical sensor in optical communication with the electrochromic device for monitoring light transmittance levels of the electrochromic device. The optical sensor is preferably adapted to monitor light in the visible and infrared ranges.

The method also preferably includes providing a controller in signal sending and receiving relation with the electrochromic device for controlling light transmittance or tinting levels of the electrochromic device. The method may also include applying a direct current through the electrochromic device for adjusting light transmittance levels of the electrochromic device.

In other preferred embodiments of the present invention, a method of determining the transmission state of an electrochromic device includes applying a voltage through the electrochromic device, using the applied voltage and current for calculating leakage current of the electrochromic device, determining ionic current as the difference between the applied current and the leakage current, and using the ionic current for determining the transmission state of the electrochromic device.

Referring to FIG. 3 the step of calculating leakage current desirably includes calculating the internal voltage of the electrochromic device using the following algorithm:

$V_{int} = V_{app} - R_s * I_{app}$.

The step of calculating the leakage current is preferably accomplished using the following algorithm:

If $V_{int} < V_T$, $I_{leak} = V_{int}/R_1$, otherwise, $I_{leak} = V_{int}/R_1 + (V_{int} - V_T)/R_2$.

The determining the transmission state step preferably includes integrating the ionic current to determine transferred charge ($Q = \int I_{ion} dt$ and correlating the integrated charge to the optical state of the EC device using the equation % T=f(Q), where f is a mathematical function or look-up table.

A preferred method for maintaining the EC device in a certain transmission state includes applying a holding voltage for maintaining the electrochromic device at a desired transmission level, wherein the holding voltage is greater if the device is fully bleached before being colored to an intermediate state and the holding voltage is less if the device is fully colored before being bleached to the same intermediate state.

The step of applying the holding voltage may include calculating an internal holding voltage for the EC device using the bleaching/coloring history of the EC device and adjusting the external voltage applied to the device (Vapp) until the calculated internal voltage matches a required value $V_{int} = V_{app} - R_s * I_{app}$.

These and other preferred embodiments of the present invention will be provided in more detail below.

DETAILED DESCRIPTION

Figure 1:
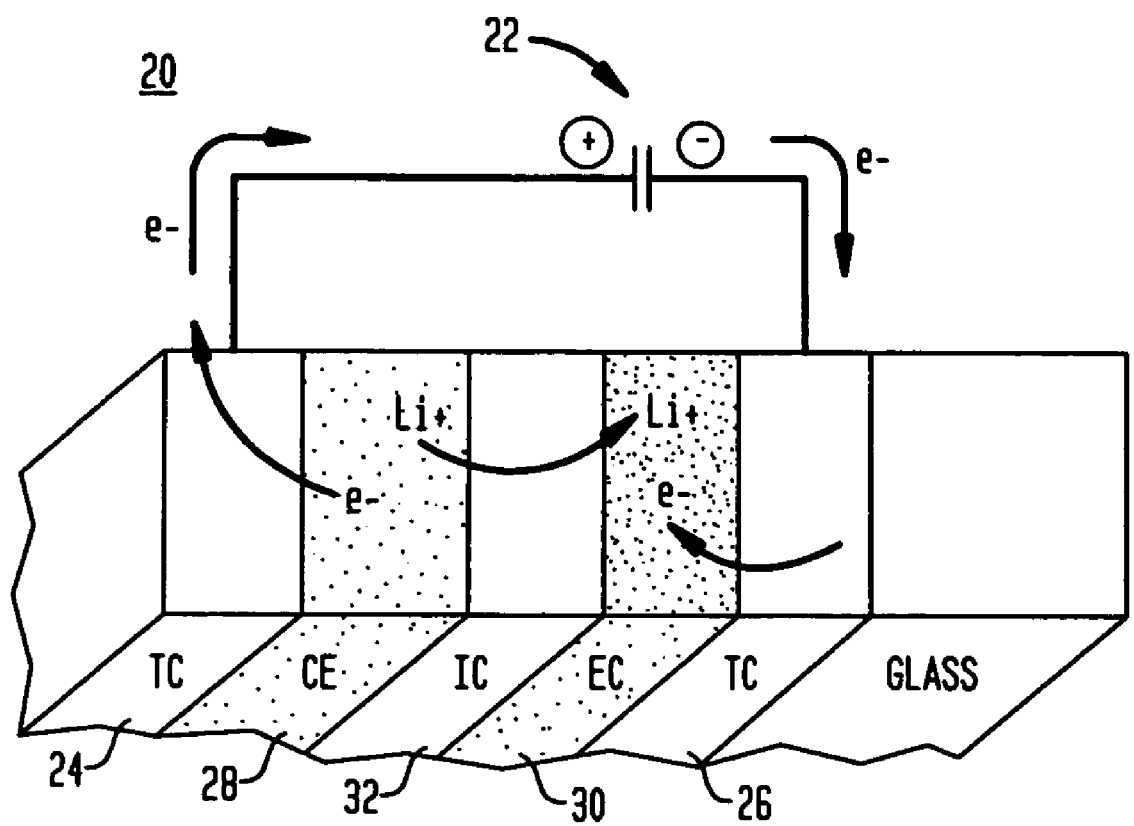
FIG. 1 shows an electrochromic structure secured to a substrate.
Figure 2A:
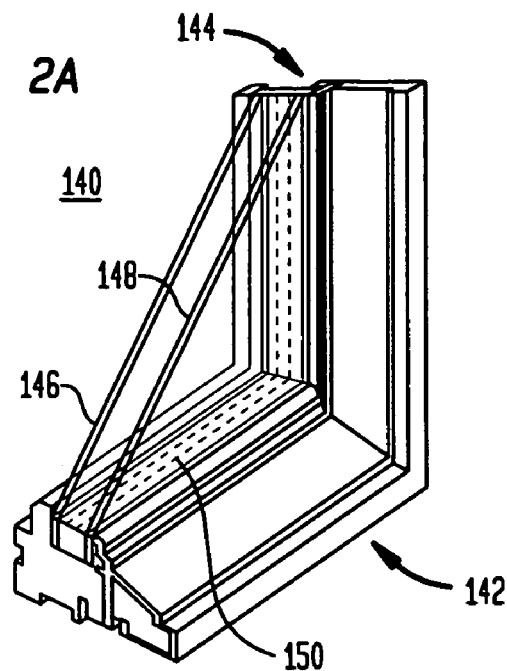
FIG. 2A shows a cut-away view of an electrochromic structure assembled with a window, in accordance with certain preferred embodiments of the present invention.
Figure 2B:
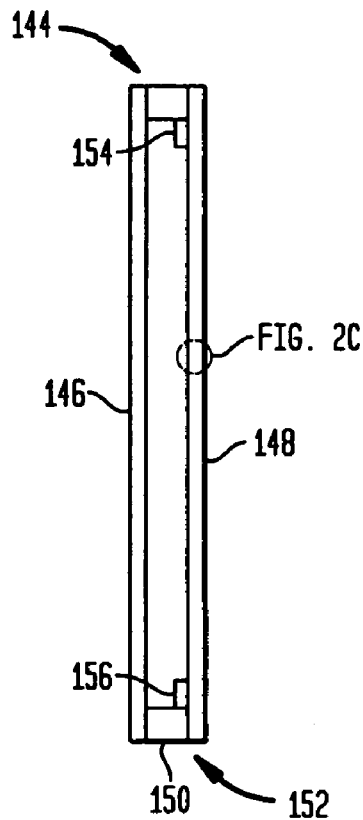
FIG. 2B shows a cross-sectional view of the window and electrochromic structure of FIG. 2A.

FIGS. 2A and 2B show an electrochromic window 140, in accordance with certain preferred embodiments of the present invention. The electrochromic window 140 includes a window frame 142 securing an insulated glass unit 144 comprising a first glass pane 146 and a second glass pane 148. The insulated glass unit 144 also includes a spacer 150 and a seal 152 for forming an air-tight compartment between the first and second glass panes 146, 148. The interior space between the first and second glass panes 146, 148 is filled with an inert gas, such as air or argon.

Figure 2C:
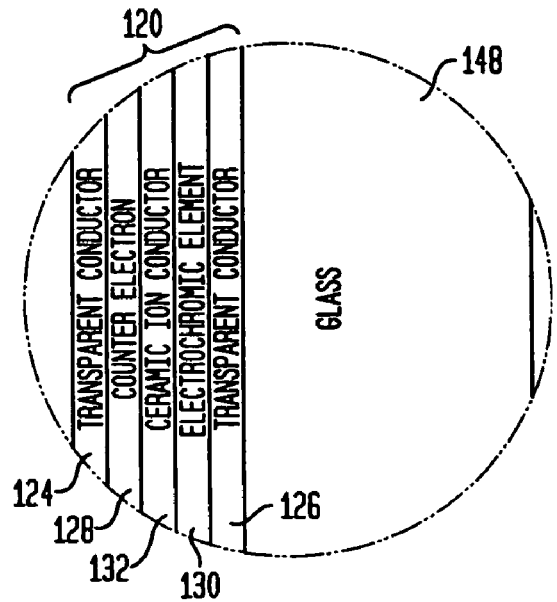
FIG. 2C shows a magnified view of the thin film layers of a solid state electrochromic device stack.

Referring to FIGS. 2B and 2C, an electrochromic device 120 is secured over the second glass pane 148 of the insulated glass unit 144. The electrochromic device 120 includes a first transparent conductor 124 and the second transparent conductor 126 in contact with second glass pane 148. The electrochromic device 120 also includes a counter electrode 128 in contact with the first transparent conductor 124, an electrochromic electrode 130 in contact with the second transparent conductor 126 and an ionic conductor 132 between the counter electrode layer 128 and electrochromic electrode layer 130. Power is supplied to electrochromic structure 120 by electrical tabs 154, 156.

Figure 3:
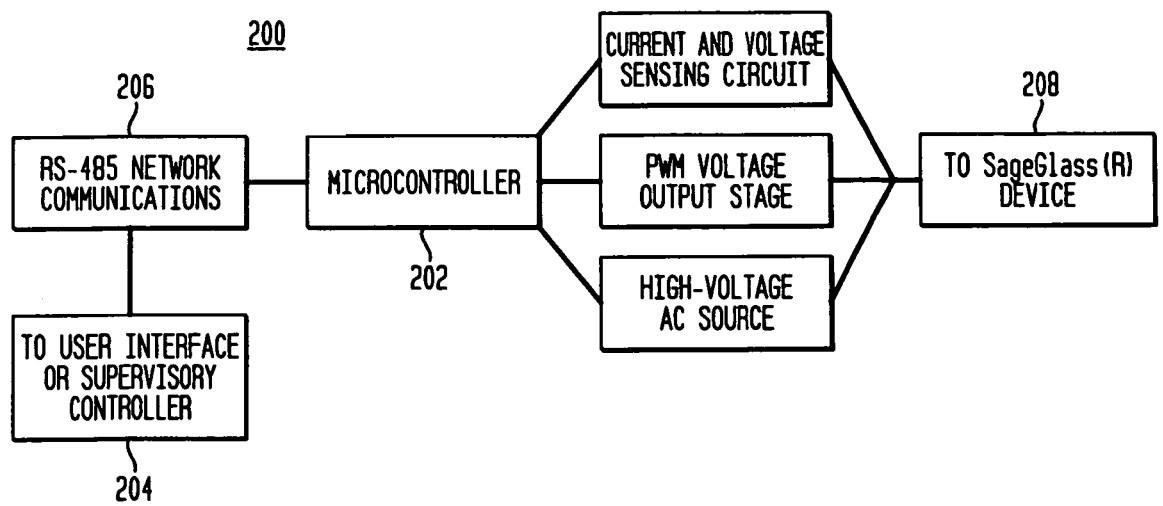
FIG. 3 shows a system for controlling an electrochromic device, in accordance with certain preferred embodiments of the present invention.

FIG. 3 shows a control system 200 for operating the electrochromic device of FIGS. 2A-2C in accordance with certain preferred embodiments of the present invention. The control system 200 includes a microcontroller 202 that receives commands from a supervisory controller or user interface via a communications protocol 206, such as an RS-485 bus. Based upon the commands received from the user interface 204, the microcontroller 202 can apply a coloring or bleaching potential to the electrochromic device 208 in order to bring it to a specified transmission level, electrically heat the device, and measure the device's approximate temperature. Preferred embodiments for accomplishing each of these functions will be described in more detail below.

Figure 4:
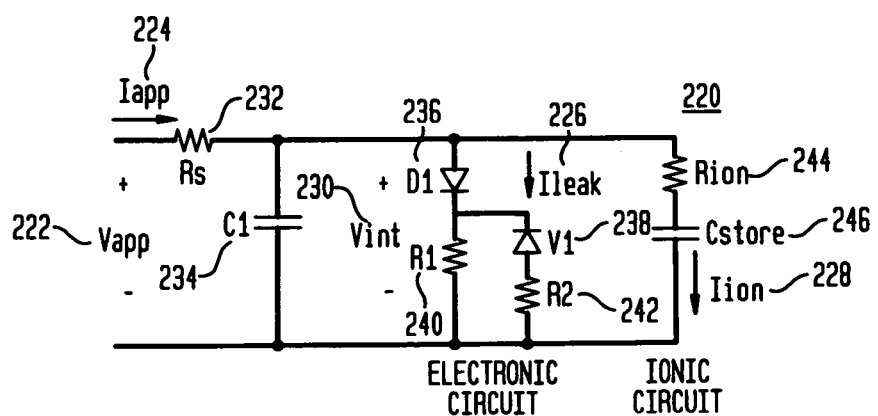
FIG. 4 shows an electrical circuit that represents a model of device performance, in accordance with certain preferred embodiments of the present invention.

FIG. 4 shows one preferred model 220 detailing electrical performance of the EC device 200 of FIG. 3. The model 220 shows the external voltage 222 ($V_{app}$) and the current 224 ($I_{app}$) applied to the device. The model 220 also shows electronic leakage current 226 ($I_{leak}$) and ionic current 228 ($I_{ion}$) in the device. External current ($I_{app}$) is the sum of the electronic leakage current 226 ($I_{leak}$) and the ionic current 228 ($I_{ion}$).

The internal voltage 230 ($V_{int}$) of the device is the approximate voltage that actually appears across the complete EC stack. This voltage is a composite approximation, as the EC stack voltage varies within a device depending on location and switching history.

The model 220 also shows linear resistance 232 ($R_s$) comprised of the wires, contacts, and bus bars, and an equivalent series resistance of the top and bottom transparent conductor layers.

C1 is the equivalent capacitance 234 of the top and bottom transparent conductor layers. D1, designated by reference numeral 236, is present in the electronic path because electronic leakage is very close to zero in the reverse direction. This is not true, however, when the device is in a fully bleached state, whereby reverse leakage can be as large as forward leakage.

R1, Vt, and R2 approximate closely the leakage behavior of an electrochromic device having a solid-state electrolyte layer. Electronic current increases linearly with voltage up to a threshold voltage, beyond which current increases much more rapidly. Vt, designated by reference numeral 238, is typically between 1.5 and 2.0V. R1 and R2, designated by respective reference numerals 240 and 242, depend on device dimensions, though R2 is typically at least an order of magnitude smaller than R1. All three of these variables (i.e. R1, $V_t$ and $R_2$) depend on temperature.

$R_{ion}$ represents the ionic impedance 244 of the electrochromic device and is a function of both device transmission level and the temperature of the device. The ionic impedance 244 can vary by more than an order of magnitude over the operating temperature range (−40 C to 100 C) of the electrochromic device of the present invention.

Cstore is the internal storage battery 246 of the EC system. The voltage on this battery 246 will generally fall between −1.0V and +2.0V. In certain preferred embodiments, device coloring and bleaching takes place between 0.0V and 1.5V.

Figure 5:
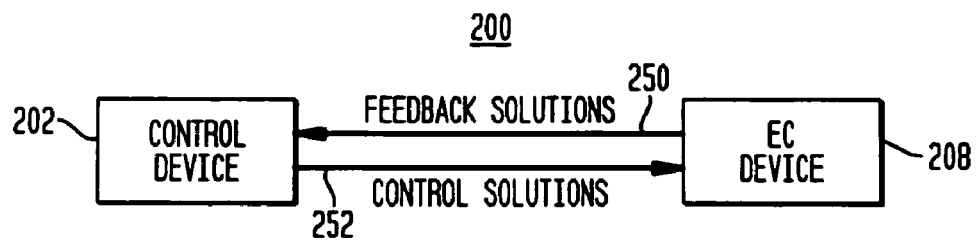
FIG. 5 shows a diagram of a control system for an electrochromic device, in accordance with certain preferred embodiments of the present invention.

Referring to FIG. 5, the control system 200 preferably includes a control device 202 and an EC device 208. Solutions for controlling EC devices may be broken into two broad categories: feedback solutions and control solutions. Feedback solutions, which are represented by the arrow 250 pointing to the control device 202, include methods of measuring device transmission, temperature, and light levels. Feedback solutions 250 may also include real-time feedback for determining the present state of the device and calibration feedback for determining device parameters when the controller is off-line. Control solutions, which are represented by the arrow 252 pointing to the EC device 208, are calculated using the feedback solutions and preferably include methods for calculating and applying the electrical power required to achieve adequate control, based on the feedback measurements received.

Figure 6:
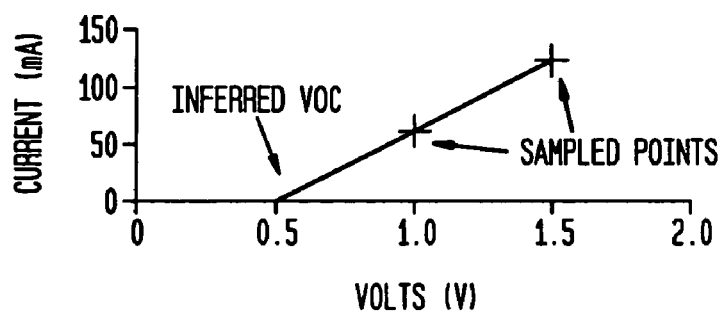
FIG. 6 is a graph of implicit open-circuit voltage measurements.

Referring to FIG. 6, in one preferred embodiment of the present invention, open-circuit voltage is used as a real-time feedback to measure the transmission state of the electrochromic device. As used herein, the terminology "transmission state" may also mean transmission level or transmissivity.

The terminology open circuit voltage ($V_{oc}$) means the voltage across the terminals of the EC device when no current is flowing through the device. As shown in the FIG. 6 graph, $V_{oc}$ is strongly a function of the state of coloration of the EC device, and can therefore be used to determine the transmission state of an EC device.

One preferred method of calculating the transmission state of an EC device includes:
1. Determining the relationships between $V_{oc}$ and the transmission or other factors (e.g. temperature, device size)
2. Measuring $V_{oc}$ on-line.
3. Using this information to calculate the device transmission state.

One preferred method for measuring $V_{oc}$ on-line is to disconnect the EC device from any controlling potential, measure the voltage across the two terminals, and then re-connect the control potential. This preferred method for measuring $V_{oc}$ may be combined with a duty-cycle modulation control approach in which a fixed control voltage is repeatedly connected to and disconnected from the device. Utilizing this method, $V_{oc}$ measurements are taken while the voltage is disconnected, and control is achieved by varying the proportion of time the control voltage is connected. Alternatively, a control voltage may be always connected except when the $V_{oc}$ measurement is being made, and control may be achieved control by varying the applied voltage.

Referring to FIG. 6, in another preferred method for determining $V_{oc}$, two different potentials are applied to the EC device and the current is measured at these two potentials. The $V_{oc}$ can then be extrapolated from the current measured at the two potentials. The measurements are preferably made rapidly, so that the EC device will not change state significantly during the duration of the measurement.

Another preferred method for obtaining a $V_{oc}$ measurement is to apply the desired open-circuit potential to the EC device terminals. If current flows into the device, $V_{oc}$ is below the desired level. If current flows out of the device, $V_{oc}$ is known to be above the desired level. Equivalently, the applied voltage may be varied until the current into the device becomes zero, at which point $V_{oc}$ is equal to the applied voltage. This method may also be used in data acquisition and control systems operating EC devices with power supplies under software control.

Figure 7:
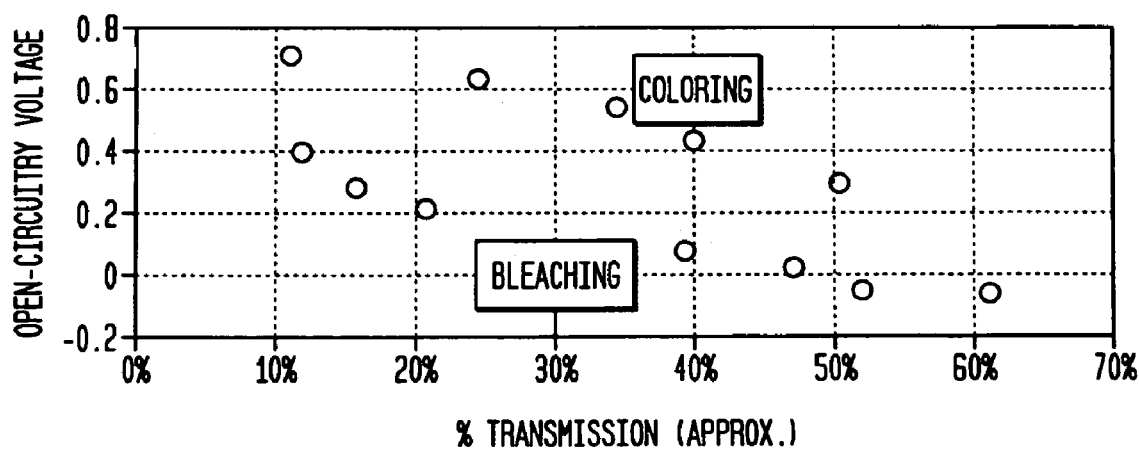
FIG. 7 is a graph showing the hysteresis effect when coloring and bleaching.

Any of the above-described methods of measuring $V_{oc}$ must overcome additional known difficulties. It has been determined that the measurement of $V_{oc}$ during coloration is different than the measurement of $V_{oc}$ during bleaching. This is because the calibration curve of $V_{oc}$ versus transmission state contains hysteresis. Moreover, the hysteresis clearly depends on how quickly the device has been colored or bleached, or how deeply it has been colored or bleached. A typical hysteresis plot is shown in FIG. 7. At least a portion of this hysteresis changes rapidly when the applied potential is removed, so that the measurement depends significantly on timing.

Figure 8:
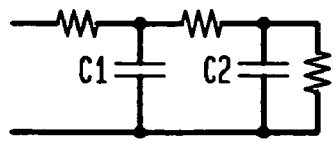
FIG. 8 shows a circuit that models a hysteresis A effect in an electrochromic device.

Although the present application is not limited by any particular theory of operation, it is believed that there are at least two separate causes of and types of hysteresis in EC devices. The first type, Hysteresis A, appears to depend on the history of current through the device, settling to zero in the open-circuit condition with a settling time measured in minutes (depending on temperature, etc.) A model that compensates for the effects of Hysteresis A is shown in FIG. 8. When coloring, the voltage across C1, which is what is measured as $V_{oc}$, will be larger than the voltage across C2. When bleaching, the voltage across C1 will be smaller than the voltage across C2. The larger the current in the device, the greater the difference will be.

Calibration measurements, both on-line and off-line, are used to parameterize the model. Then, the model is applied in real-time to measurements of voltage and/or current to calculate a compensation factor for Hysteresis A, which is then used in conjunction with $V_{oc}$ by the control algorithm to achieve and maintain a repeatable transmission state. Hysteresis A is a constant offset voltage added to the open-circuit voltage when bleaching and subtracted from $V_{oc}$ when coloring, with no offset added or subtracted when no potential is applied (i.e., when the device is left to self-bleach). This preferred method significantly reduces the sudden change in $V_{oc}$ measurements when changing from an applied coloring voltage to an applied bleaching voltage or vice versa.

The effects of Hysteresis A may be largely eliminated by one or more of the preferred control methods set forth herein. Hysteresis A appears to diminish fairly rapidly to a consistent level when a small bleaching current is applied. Thus, applying a small bleaching current for 5-15 seconds prior to measuring open-circuit potential may largely remove this portion of the hysteresis.

The second type of hysteresis, Hysteresis B, is more persistent than the first type, appearing to have a vastly longer settling time than Hysteresis A (hours at least) under most conditions of applied voltage and current. However, Hysteresis B appears to change rapidly whenever the EC device approaches a fully colored or fully bleached state. If the device is fully bleached, Hysteresis B will be at one extreme. If fully colored, it will reach another extreme.

Hysteresis B is also preferably amenable to a different model, one based on a look-up table of hysteresis level vs. most recent extreme reached. In one particular preferred embodiment, if the device is colored to 5% and then bleached to 30%, the lookup table provides a compensation value. If colored to 3% and then bleached moderately, another compensation value from the lookup table would be used. In preferred embodiments, Hysteresis A and Hysteresis B may be calculated in a similar fashion by applying a model to the current state of the device, and using the resultant hysteresis level as a compensating factor in calculating transmission. A control algorithm stored in a memory device or controller preferably uses a model of Hysteresis A and B concurrently to provide compensation for both types of effects.

Extracting model information from the device and then running a model in real-time is not simple. However, given the slow nature of the process (a control algorithm only needs to be updated once every few seconds for a large device), even an inexpensive microprocessor will be up to the task. In fact, a reasonably inexpensive processor in the control device preferably performs these calculations for multiple devices simultaneously.

A second preferred method for compensating for Hysteresis B involves measuring at least two independent parameters, which are correlated to a device state, and then mathematically separating state from hysteresis level. The capacitive admittance of the device is another parameter, which may be used as a second indicator of device state.

Transmission and hysteresis level may be thought of as a two-dimensional space, requiring a two-dimensional measurement to resolve accurately. Modeling uses historical information in addition to open-circuit voltage to provide a two-dimensional measurement. Another preferred method identifies two independent measurements, which are used to calculate transmission accurately.

Figure 9A:
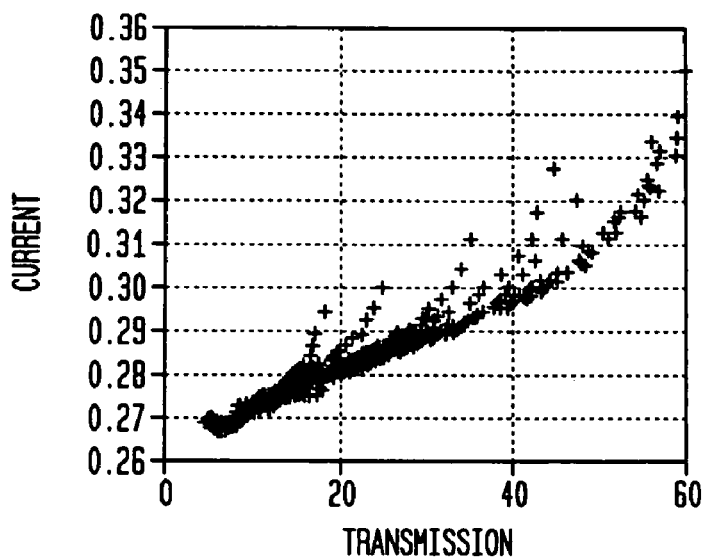
FIG. 9A is a graph depicting the relationship of coloring current to transmission state.
Figure 9B:
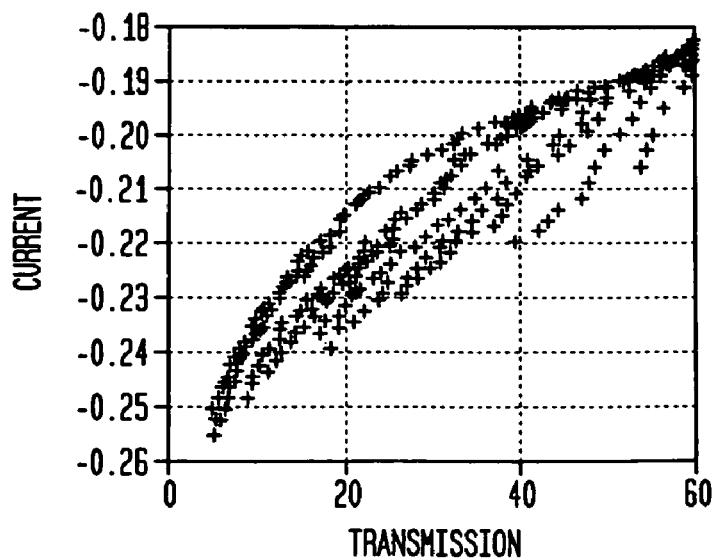
FIG. 9B is a graph depicting the relationship of bleaching current to transmission state.

FIG. 9A shows a graph depicting the relationship of coloring current to transmission state. FIG. 9B shows a graph depicting the relationship of bleaching current to transmission state. Hysteresis is seen throughout the entire bleaching cycle. In other words, virtually every bleaching cycle has a different current-transmission relationship at a constant voltage. However, this is not seen in the coloring current graph of FIG. 9A. As shown in FIG. 9A, after an initial hysteresis region, all coloring cycles converge to a relatively consistent current-transmission relationship. As such, it is clear that after a minimum coloring period (e.g., a minute or so) the coloring current is a good indicator of transmission state at a given temperature.

When coloring for short periods of time, it has been determined that dI/dt is a good indicator of how far the I/T relationship is from the region of good correlation. Thus, dI/dt can be used in conjunction with I when coloring to accurately determine transmission. When bleaching, one has to color only briefly (i.e., not long enough to substantially change transmission state) to determined device state.

Another control factor that must be considered is device temperature variations. It has been determined that a small temperature variation will cause significant changes in device current, dramatically altering the current/transmission relationship. If device bulk AC impedance (at about 0.1-1 Hz) is measured as the change in voltage divided by the change in current when switching from coloring to bleaching or vice versa, and $V_{meas}$ (comparable to $V_{oc}$) is calculated as V-IR, the result is far less temperature sensitive than is the current measurement alone.

In view of the above discussion, preferred methods of measuring transmission of an EC device include the following:

Bleach briefly; measure current.
Color briefly; measure current. Calculate resistance (R).
Color a little longer; measure current. Calculate dI/dt.
Calculate compensated current as $I_{comp}$=I+K(dI/dt).
Compute $V_{meas}$=V−$I_{comp}$R.
Calculate transmission as a function of $V_{meas}$.

It is assumed that the function for transmission calculation, as well as K, is dependent on temperature. In addition, the length of time required to accurately calculate dI/dt will be longer at colder temperatures.

Figure 10:
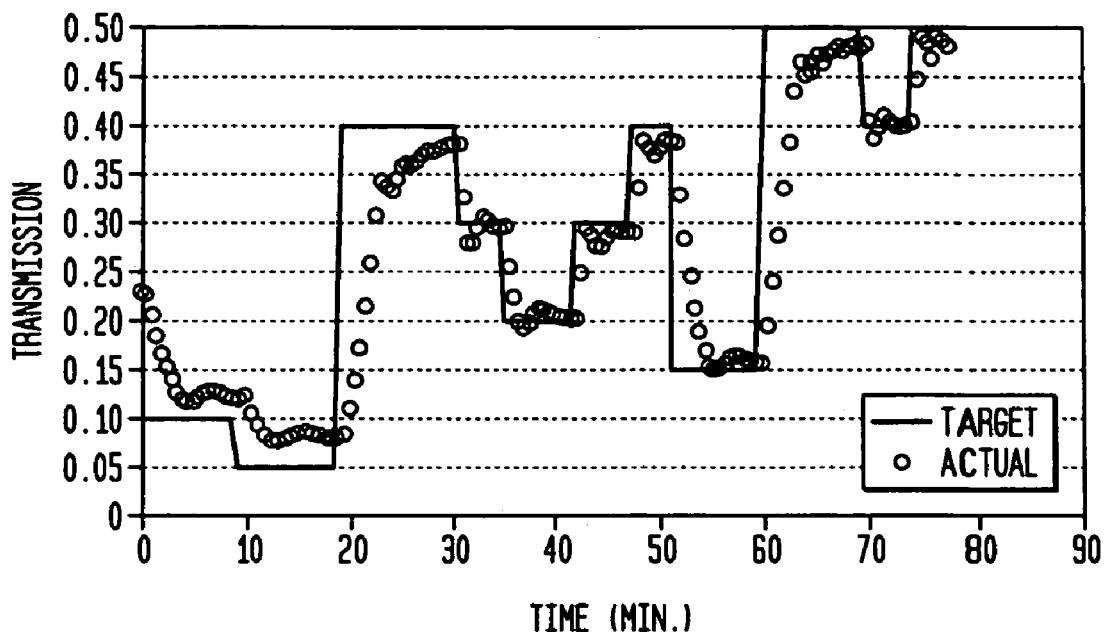
FIG. 10 is a graph depicting a control system response when measuring the transmission level of an electrochromic device, in accordance with certain preferred embodiments of the present invention.

FIG. 10 shows a graph depicting a control system response using the above-identified algorithm. The specific time periods used were 5 seconds bleaching; 2.5 seconds coloring to calculate R; color for 2.5 seconds more and measure current, and then color 5 seconds more and measure current to get two current values to calculate dI/dt.

Simple proportional control was used, which accounts for the 2-3% error at low transmission levels. However, the addition of integral control or full PID will eliminate these errors. On long bleach events, however, the residual hysteresis will gradually disappear. This has been reduced over the first attempt by reducing the time interval used to calculate R.

Prior art EC devices measure the temperature of the device using sensors. However, this approach has caused a variety of problems. For example, for obvious aesthetic reasons, sensors must be positioned at the edge of the device. However, substantial temperature gradients may exist between the center of the device and the edge of a device. In addition, any sensor attached to the electrochromic surface must meet stringent material requirements so as to avoid damaging the EC device. In addition, the use of external sensors may require that additional wires be brought out of the sealed space, either in a laminate or an insulated glass unit (IGU), adding considerable complexity. Furthermore, sensors add to the cost of the controller.

A study of solid state electrochromic devices indicates that ionic current varies significantly with temperature. This determination may be used to measure the temperature of an EC device without requiring the use of a separate temperature sensor on the device.

At high temperatures (e.g., 70 C), an electrochromic device may be damaged by voltages exceeding 2.5V. But at low temperatures (e.g., 0 C), higher voltages (typically 4.0V) are required to color a device in a reasonable period of time. Thus, it is essential to know the approximate temperature of an EC device in order to control it properly.

Figure 11:
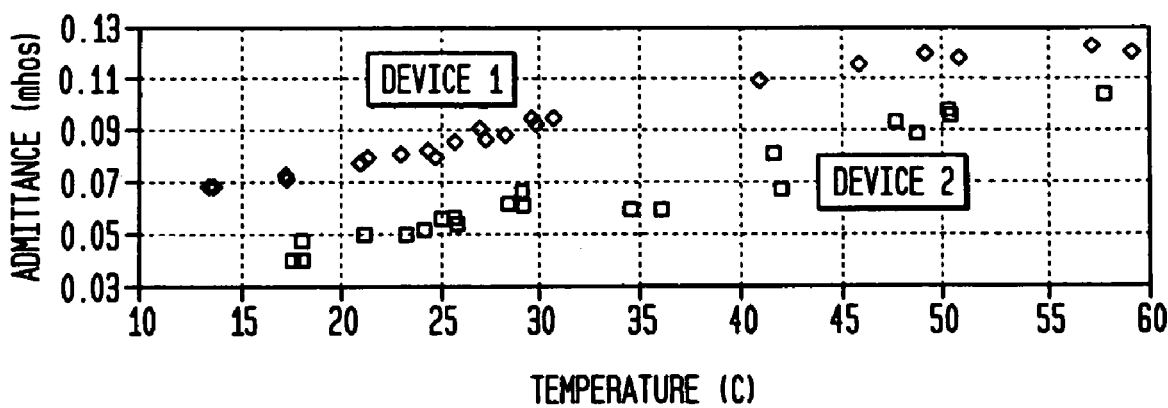
FIG. 11 is a graph depicting ionic conductivity of two electrochromic devices at various temperatures.

In one preferred method, impedance measurements are used at one or more frequencies to establish device temperature. This preferred method measures the AC resistance of the device at around 0.01-0.1 Hz by applying two voltages alternately and calculating the resistance as the change in voltage divided by the change in current. Although this measurement is affected by some combination of transparent conductor resistance, ionic conductivity, and leakage current, it is known that ionic conductivity has the largest temperature variation, and this measurement has been shown to have a strong correlation with temperature. During various experiments, the preferred method has accurately predicted temperature within about 3 degrees C. at moderate temperatures (10-50 C). Sample results for two devices are shown in the FIG. 11 graph.

A review of EC device test data indicates that temperature measurement is substantially independent of device state. However, it will, if measured at too high a frequency, depend on whether the device has been recently colored or bleached (the frequency limit appears to increase with increasing temperature). It also depends strongly on the voltage used to measure the resistance. In other words, the resistance is significantly nonlinear. This effect can be used to vary the sensitivity of the measurement at different temperature ranges.

In other preferred embodiments, measurements are taken at multiple frequencies to parameterize a voltage-current transfer function for the device, and the temperature is calculated using one or more combinations of the parameters.

In certain preferred embodiments of the present invention, temperature is measured by calculating the impedance of the device under a specific set of conditions and correlating this measurement to the temperature of the device. This preferred method uses the same hardware already required to color or bleach the device, so that it does not add to the cost. The most temperature-dependent element in the model (FIG. 4) is the ionic impedance ($R_{ion}$), so this is the primary factor affecting this measurement.

Electrical current in a preferred device depends on a combination of applied voltage, device transmission state, and recent control history. One preferred method for determining the temperature of an EC device is as follows:

1. Apply a coloring voltage $V_c$ for a fixed period (typically 10-20 seconds).
2. Measure device current $I_C$ at the end of this period.
3. Apply a bleaching voltage $V_B$.
4. Measure the device current $I_B$ at a fixed time after the voltage transition (typically 0.5-1.0 seconds).
5. Calculate impedance as the ratio of voltage change to current change, $(V_c-V_B)/(I_c-I_B)$.
6. Calculate temperature from this impedance based on a look-up table.

In other preferred embodiments, a bleaching voltage may be applied first, and the voltage application durations may be altered.

Thus, control of applied voltages is accomplished by:

1. Applying the above-identified temperature algorithm to determine approximate temperature.
2. Calculate, from an equation or look-up table, an appropriate applied voltage for the approximate temperature.

Other preferred embodiments of the present invention enable an EC device to be heated. Heating an EC device is useful for a number of reasons, particularly the elimination of condensation and improving switching speed at low temperatures. Although heating electrochromic devices is well known in the prior art, such prior art schemes generally require the use of additional bus bars. For example, two bus bars are used for coloring/bleaching, and a third bus bar is used for heating. In U.S. Pat. No. 5,353,148, four bus bars are employed for heating the EC device. In these prior art schemes, the bus bars used for heating are attached to the same transparent conductor layer and heating is done by passing current through the transparent conductor layer. However, adding additional bus bars to an electrochromic device for heating is difficult. This is particularly true for solid state EC devices deposited on a single pane of glass.

In accordance with certain preferred embodiments of the present invention, an EC device may be heated by utilizing the inter-layer capacitance of the device to achieve significant power consumption in the transparent conductors without damage to the device. In one preferred method, a relatively large AC voltage (e.g. 20V at 10 kHz.) is applied to an EC device. The low-pass filter comprised of Rs and C1 (FIG. 4) will prevent the actual electrochromic layers from receiving a high voltage, which could damage the device. The AC power will instead generate heat in the two transparent conductor layers. Experimental data indicates that about 100 W is required to heat a 19"×37" EC device in an IGU to a temperature of 10 C above ambient temperature. A typical 19"×37" all solid state EC device has an Rs value of about 5 ohms, requiring around 22 VAC to provide 100 W heating. About 250 W are required to achieve a similar temperature increase in a 5-minute time period.

This preferred method of heating EC devices is desirably used for all-solid-state devices. In other preferred embodiments, the method may be used for EC devices having polymeric ion conductors.

Another purpose of the present invention is to provide indication of damage to the glass or wiring for purpose of security. A high-frequency impedance measurement of the EC device will yield Rs (FIG. 4), a resistance comprised of the transparent conductor and wires that is constant with respect to time, temperature and device state. If this measurement changes, it indicates damage, which could be used as a security alarm indicator.

In another preferred embodiment of the present invention, an EC device controller providing AC heating can be used as a security alarm by providing an indication when a window has been broken. In this preferred embodiment, the value Rs may be calculated from the applied AC voltage and current. Since Rs doesn't change with temperature or over time, any change in Rs signifies damage to the window or wiring.

In other preferred embodiments, the device shown in FIG. 4 can be used to control an EC device to a specified transmission level using the following two-step process:
1. Use a charge-counting algorithm to determine device state while in transition.
2. Use a voltage-holding algorithm to maintain desired device state.

In most electrochromic device controllers, device state is determined by counting (integrating) charge passed through the device. With electrochromic devices with very small leakage (such as polymer electrolyte electrochromic devices), external current is equal to ionic current, making this approach very straightforward. The total integrated charge can be correlated directly to device optical state.

However, with solid state EC devices having significant leakage current, the external current can be significantly different than the ionic current. As a result, simply counting charge to determine device state is not adequate.

In certain preferred embodiments, device state for an all solid state EC device may be determined using the following algorithm:
1. Calculate leakage current, using the device model and applied voltage and current:

$V_{int} = V_{app} - R_s * I_{app}$ (Calculate internal voltage—see model.)

If $V_{int} < V_T$, $I_{leak} = V_{int}/R_1$. Otherwise, $I_{leak} = V_{int}/R_1 + (V_{int} - V_T)/R_2$.

2. Calculate ionic current as the difference between applied current and leakage current:

$I_{ion} = I_{app} - I_{leak}$

3. Integrate the ionic current only to determine transferred charge (Q) and correlate the integrated charge to the optical state of the device.

$Q = \int I_{ion} dt$

% T=f(Q), where f is a mathematical function or look-up table. Typically, light transmission is related logarithmically to Q.

The device model is a function of temperature. However, the most temperature-dependent feature—the ionic impedance—does not appear in the above algorithm. The remaining elements are only moderately temperature-dependent, so that the temperature dependence of the model can be implemented using only a few discrete temperature ranges with adequate accuracy, using the coarse temperature measurement described previously.

Applying this algorithm at low temperatures—e.g., below 0 C—can be difficult, as the leakage current can exceed the ionic current, sometimes significantly so. This causes any error in the model to accumulate rapidly, diminishing the accuracy of the ionic charge counting. Thus, at low temperatures, it may be desirable to heat the device to significantly improve control efficacy.

The charge-counting algorithm described above cannot be used to hold a device at a given state, as any errors in the model will accumulate over time, causing drift in the device state. So, once the desired state is reached, the voltage-holding algorithm described below is employed.

An EC device having a polymeric ion conductor can be maintained at a constant transmission level by removing the applied voltage, and then occasionally checking the open-circuit potential. Based on this voltage, a small charge is injected to compensate for the very slight leakage current of the device. This technique for maintaining the transmission level of an EC device will not work, however, for an electrochromic device with a solid-state ion conductor. With a solid state EC device, the device will begin to bleach when the applied potential is removed. The open-circuit potential will not reach equilibrium before the device has bleached significantly. Thus, the device must receive constant power to maintain its coloration level. The process by which the EC controller of the present invention accomplishes this is outlined below.

Once a device is at the desired transmission level, applying the correct DC voltage will maintain the device in that state indefinitely. The internal voltage ($V_{int}$ in the model) while holding may be considered to be independent of temperature. It does, however, vary from device to device and shows hysteresis effects, i.e. it depends on the coloring/bleaching history of the device. If a device is fully bleached, then colored to an intermediate state, the required holding voltage will be greater than if it is fully colored, then bleached to the same intermediate state.

The voltage-holding algorithm, then, is simply given as follows:
1. Calculate the required internal holding voltage based on the calibrated requirements of the device, and the coloring/bleaching history of the device.

2. (FIG. 4) Adjust the external voltage ($V_{app}$) until the calculated internal voltage ($V_{int}$) matches the required value, $V_{int} = V_{app} - R_s * I_{app}$.

Figure 12:
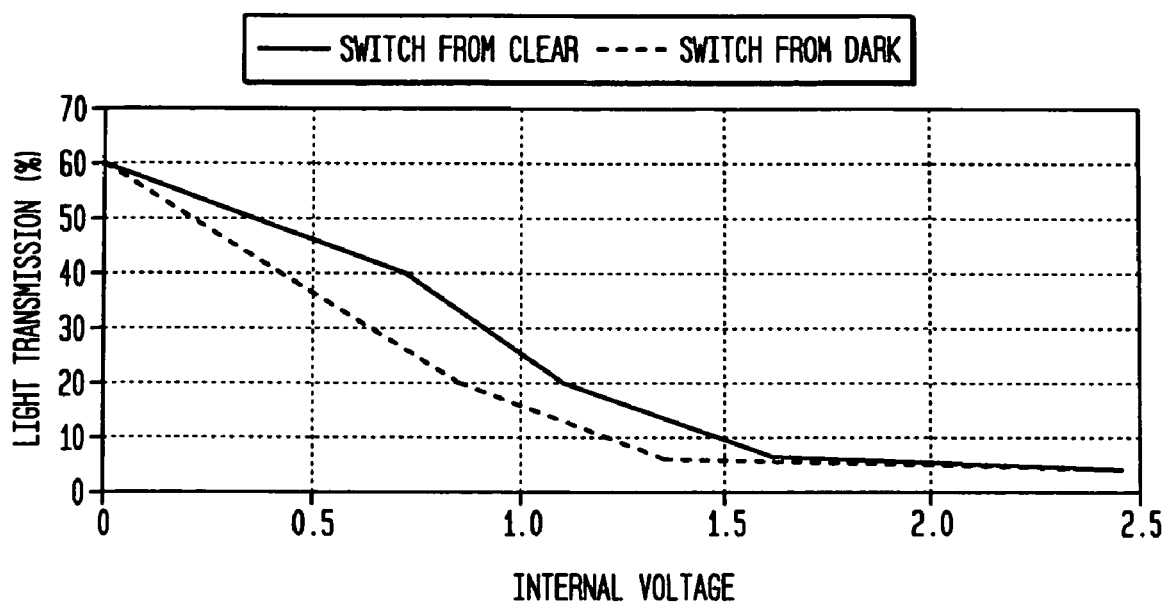
FIG. 12 is a graph showing a curve of holding voltage vs. required optical density when switching from dark and when switching from clear.

A sample curve of holding voltage vs. required optical density is shown in FIG. 12. The graph shows that due to hysteresis effects a different holding voltage is required when switching from dark as opposed to when switching from clear.

Figure 13:
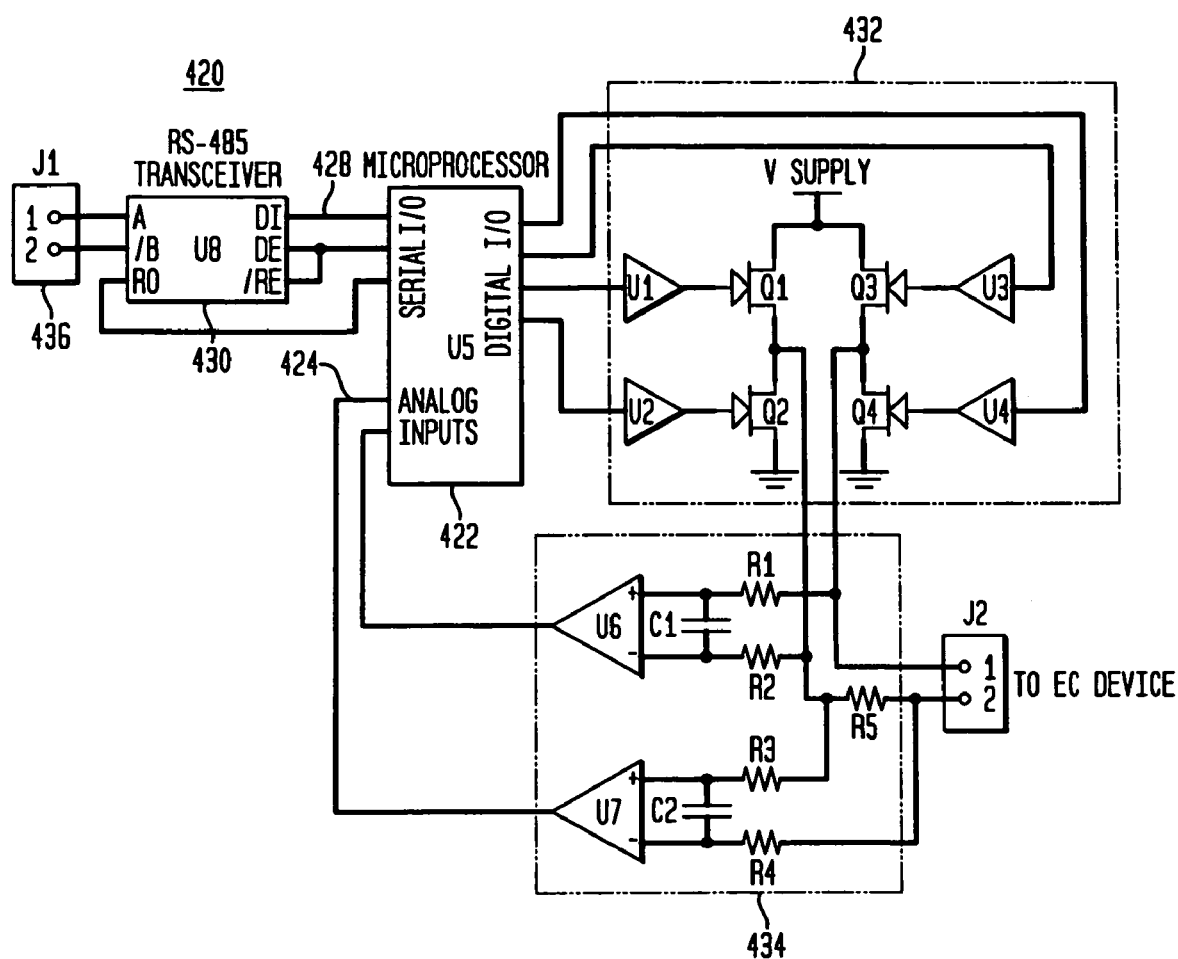
FIG. 13 is a more detailed version of the circuit of FIG. 3 and shows a control circuit for an electrochromic (EC) device including a microprocessor and driver circuitry, in accordance with another preferred embodiment of the present invention.

FIG. 13 shows a circuit 420 used for controlling and heating an electrochromic device, in accordance with certain preferred embodiments of the present invention. The circuit shown in FIG. 13 does not include every component required to make a functional circuit, but rather shows the core components required to achieve the heating, control and security functions.

As shown in FIG. 13, the circuit 420 includes a microprocessor 422 having analog inputs 424, digital I/O 426, and an asynchronous serial communication I/O 428. The circuit 420 includes three modules: a networked serial communication 430, an electrochromic driver 432, and a feedback circuit 434 which, along with the microprocessor 422, provide the required functionality. The three modules are described in detail below.

The Networked Serial Communication 430 preferably includes a RS-485 protocol transceiver U8 that is designed to translate the logic-level serial communication signals available from microprocessor 422 into the standard RS-485 signal levels made available at connector J1 436. This functionality is well known, and integrated circuit U8 430 may be chosen from a wide range of readily available products. The J1 connection 436 may be connected with a computer, a controller, a user interface, etc.

The driver circuit 432 preferably includes a MOSFET h-bridge comprised of MOSFET transistors Q1, Q2, Q3, and Q4, along with driver circuits U1, U2, U3, and U4. H-bridge circuits are well known as an efficient means of providing a bipolar output voltage from a unipolar supply. When under the control of microprocessor 422, the h-bridge can be used to provide independent coloring/bleaching and heating control.

FIGS. 14-17 show exemplary pulse width modulation (PWM) waveforms for the circuit 420 in respective coloring, bleaching, heating, and coloring and heating modes. The voltage level used to color or bleach an EC device (FIGS. 14 and 15) can generally not exceed 4V, as voltages of over 4V will tend to damage the EC device. In preferred embodiments of the present invention (FIGS. 16 and 17), however, the applied voltage can be 12-24V or higher, because the voltage is applied at 100 Hz or higher. The high switching speed for the voltage enables higher voltages to be applied to the EC device without damaging the device.

Figure 14:
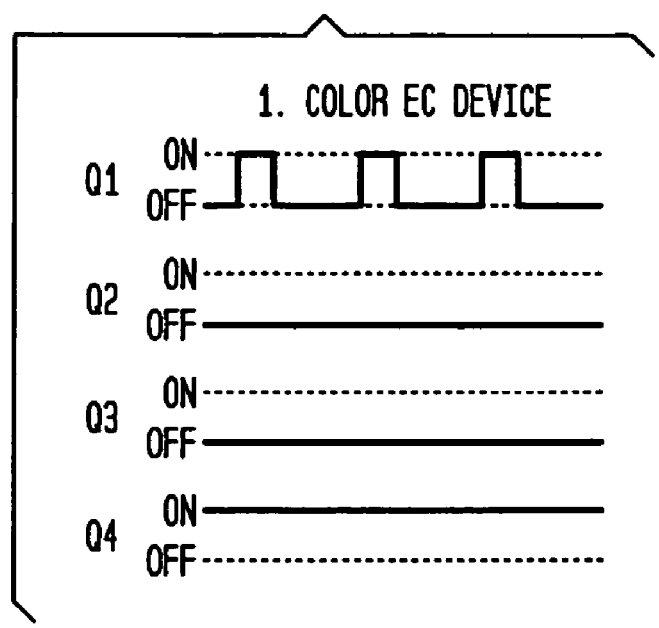
FIG. 14 shows a sample pulse width modulation (PWM) waveform for the driver circuitry of FIG. 13 for coloring an EC device.

Referring to FIGS. 13 and 14, when coloring an EC device, MOSFET transistors Q2 and Q3 are left in the off state, Q4 is left on, and Q1 is given a PWM signal (100-500 kHz in the preferred embodiment.) When Q1 is turned on, current flows through the EC device through Q1 and Q4. When Q1 is off, no current flows. The duty cycle is varied to give an average applied voltage of 2-3V DC, as required to color the device. Average power is low enough to keep heating effects low. Average power is also low enough to avoid damage to the EC device.

Figure 15:
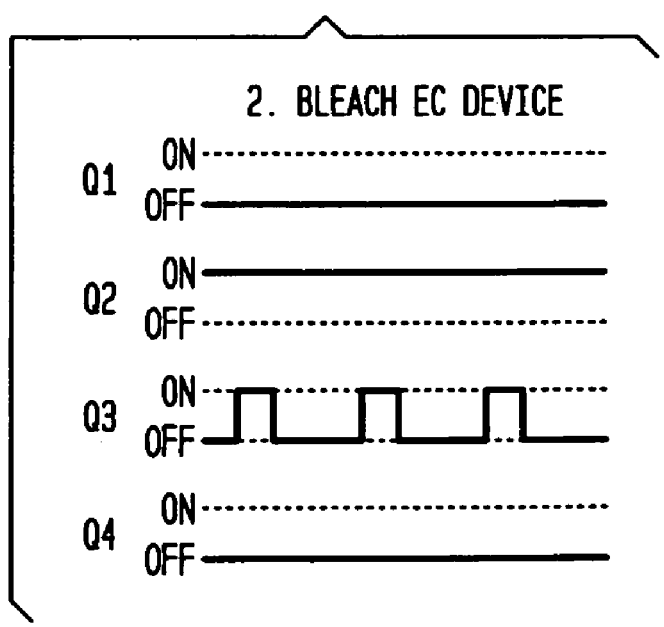
FIG. 15 shows a sample PWM for the driver circuitry of FIG. 13 for bleaching an EC device.

Referring to FIGS. 13 and 15, bleaching the EC device is almost identical to coloring, except that MOSFET transistors Q2 and Q3 take the place of Q1 and Q4, causing current to flow in the reverse direction. Specifically, Q1 and Q4 are left in the off position, Q2 is left on, and Q3 is given a PWM signal (100-500 kHz in the preferred embodiment). Again the duty cycle is varied to supply an average voltage of 1-2V DC, and average power is low.

Figure 16:
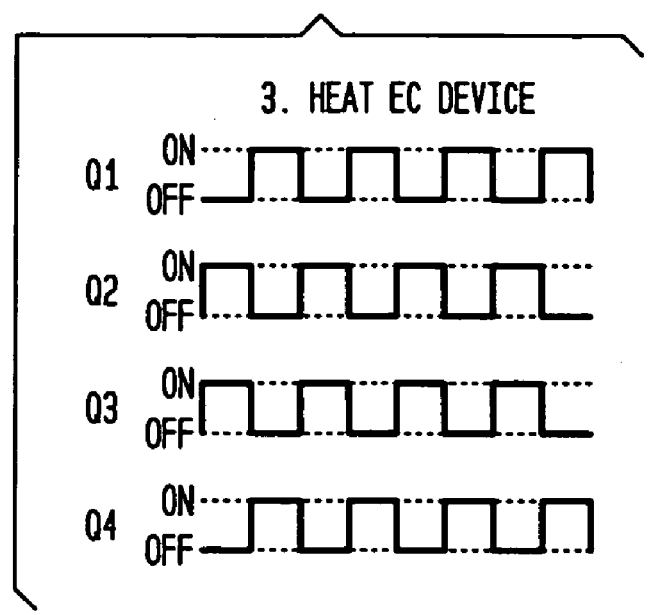
FIG. 16 shows a sample PWM for the driver circuitry of FIG. 13 for heating an EC device.

Referring to FIGS. 13 and 16, heating the device is accomplished by alternately switching on and off transistor pairs Q1 and Q4, and Q2 and Q3. For 50% of the cycle, current flows through the EC device via Q1 and Q4 in one direction, while during the other 50% of the cycle, current flows through Q2 and Q3, supplying EC current in the opposite direction. As a result, average applied voltage (and current) is zero, providing zero effective switching voltage, but power consumed is high enough to provide substantial heating. In one preferred embodiment, 12V are applied at over 100 Hz. Generally, applying this amount of voltage would permanently damage the EC device. However, alternating the 12V at the relatively high frequency (over 100 Hz) enables the EC device to be heated without using an extra heating component and without damaging the EC device. It has been observed that applying 12V at less than 100 Hz may cause damage to the EC device. In another preferred embodiment, 12-24V is applied at 1-10 kHz to heat the EC device.

Figure 17:
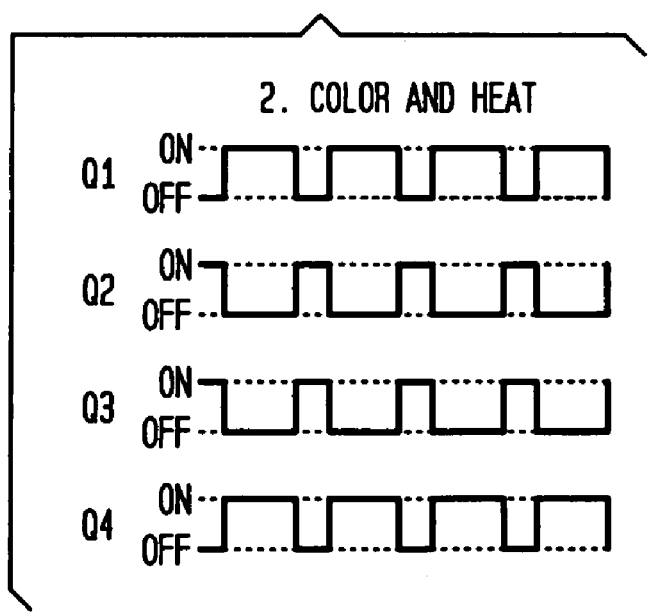
FIG. 17 shows a sample PWM for the driver circuitry of FIG. 13 for simultaneously heating and coloring an EC device.

Referring to FIGS. 13 and 17, simultaneous heating and coloring or simultaneous heating and bleaching can be accomplished by varying the duty cycle of the heating cycle. If the duty cycle is greater than 50% (i.e. more time spent with positive polarity than negative), average applied voltage is positive, and the device colors. This particular cycle is shown in FIG. 17. If the duty cycle is less than 50%, average applied voltage is negative, and the device bleaches.

Referring to FIG. 13, circuit 420 also includes feedback circuitry 434 that allows the microprocessor 422 to sample the voltage and current applied to the EC device. The feedback circuitry includes a low-pass filter comprised of resistors R1 and R2 and capacitor C1, which removes the high-frequency component of the output voltage. The remaining low-frequency signal is then amplified and level-shifted into a voltage range (preferably 0-5V DC) acceptable to the microprocessor analog inputs. Current-sensing resistor R5 converts the output current into a voltage. The high-frequency component of the voltage is removed by the low-pass filter comprised of resistors R3 and R4 and capacitor C2. The feedback circuitry also includes a differential amplifier U7 that amplifies the low-voltage signal into a voltage range (preferably 0-5V DC) acceptable to the microprocessor analog inputs 424.

Figure 18:
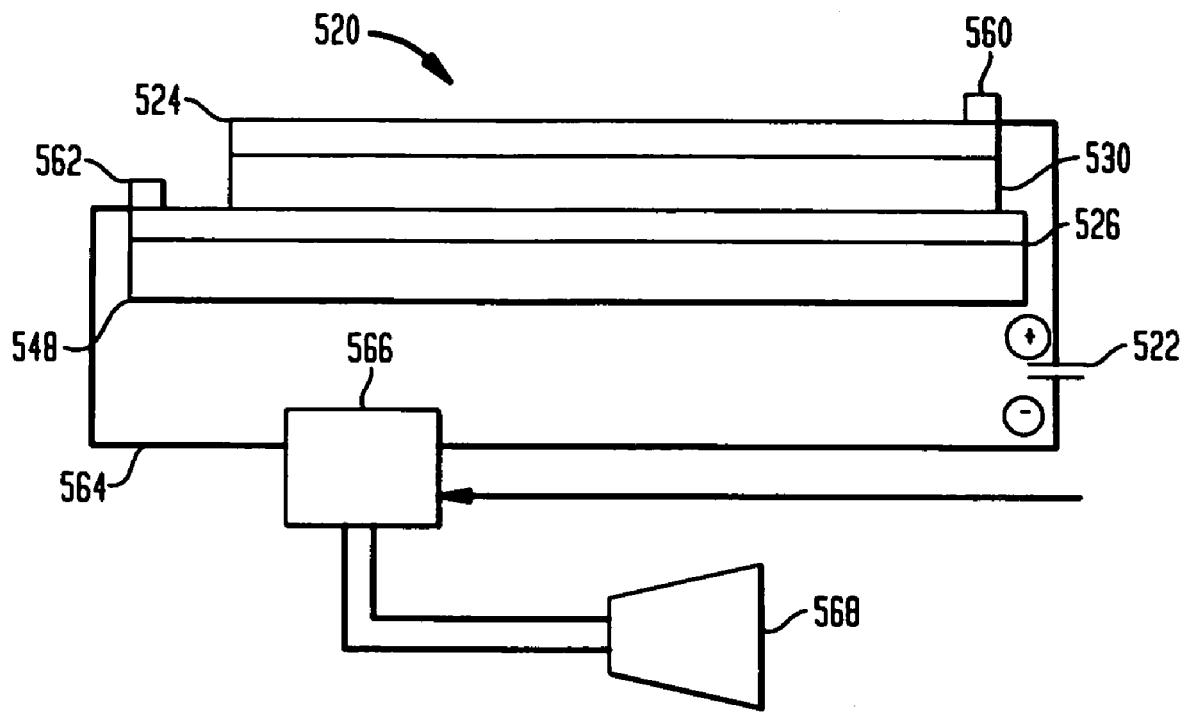
FIG. 18 shows an electrochromic structure assembled with a substrate, in accordance with certain preferably embodiments of the present invention.

FIG. 18 shows an electrochromic security glass assembly, in accordance with certain preferred embodiments of the present invention. The assembly includes a substrate 548 such as a substantially transparent glass pane. An electrochromic structure 520 is formed atop the substrate 548. The electrochromic structure 520 preferably includes a first transparent conductive layer 524, a second transparent conductive layer 526 in contact with substrate 548, and at least one electrochromic film 530 between the first and second transparent conductive layers. The electrochromic structure also includes a first electrically conductive bus bar 560 in electrical communication with first transparent conductive layer 524 and a second electrically conductive bus bar 562 in electrical communication with second transparent layer 556. The assembly includes a circuit 564 connecting the first and second bus bars 560, 562 with a power source 522. The assembly also includes a controller 566 adapted to continuously monitor the electrical properties of the electrochromic structure 520.

In one particular preferred embodiment, an alternating current in passed through the electrochromic structure at a frequency of approximately 0.1-100 KHz and more preferably at a frequency of approximately 1-10 KHz. Although the present invention is not limited by any particular theory of operation, it is believed that at this frequency, the capacitive impedance is very low compared to the resistance, thereby leaving the series resistance Rs as the only measured variable. As resistance is almost completely independent of the temperature of the device and of the condition of the device, the controller 566 is able to monitor any change in the alternating current resistance. As a result, any significant change in AC resistance represents a device failure, which may indicate a security breach. At such time, the controller will generate an alarm signal that is forwarded to alarm unit 568 for production of an electric or audio signal.

Figure 19:
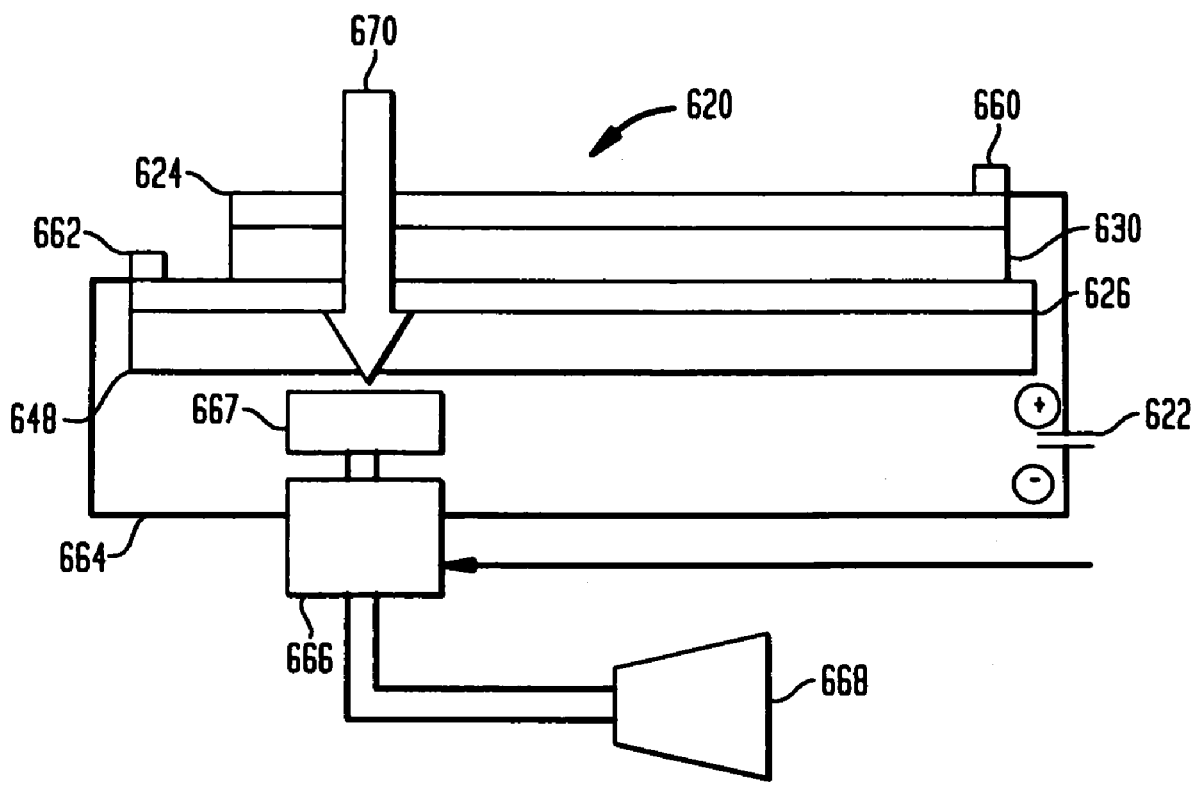
FIG. 19 shows an electrochromic structure assembled with a substrate, in accordance with other preferred embodiments of the present invention.

Referring to FIG. 19, in another preferred embodiment of the present invention, an electrochromic security glass assembly includes an electrochromic structure 620 assembled over substrate 648. The electrochromic structure includes a first substantially transparent conductive layer 624, a second transparent conductive layer 626 and at least one electrochromic film 630 secured therebetween. The electrochromic device 620 also includes first bus bar 660 in electrical communication with first transparent conductive layer 624 and a second bus bar 662 in electrical communication with second transparent conductive layer 626. The assembly also includes a circuit 664 connected with power source 622 for providing current through the electrochromic device. The assembly also includes a controller 666 and an optical sensor 667 in communication with controller 666. The electrochromic security glass assembly also includes an alarm 668 that is adapted to generate an electronic or audio signal in response to instructions from controller 666.

In operation, light in the visible and near infrared ranges 670 passes through electrochromic structure 620 and substrate 648. The amount of light 670 that is able to pass through the assembly may be varied continuously and reversibly by applying a direct current through electrochromic structure 620. The electrochromic structure will remain at a desired transmission level for extended periods until current is reapplied to change the level of light transmission. The optical sensor 662 is adapted to monitor and control the degree of tinting of the electrochromic structure based upon user preferences. If the integrity of the electrochromic structure is compromised indicating a security breach, the optical performance of the assembly will change significantly. At such time, controller 666 will produce an alarm signal transmitted to alarm 668 for generating an alarm.

In yet other preferred embodiments, an all-solid-state electrochromic device includes a controller capable of sensing the intrinsic leakage current or resistance between the first and second transparent conductive layers. The resistance is directly proportional to the contiguous area of the device, so that any breakage of the electrochromic device will lead to a reduction in the contiguous area and hence a detection of a change in current leakage. The resistance of the device is inversely proportional to the area of the device so that any loss of active area will lead to an increase in the resistance or a decrease in the leakage current. Sensing circuitry is adapted to test for any such changes and generate an alarm signal upon detecting such changes.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by, the appended claims.

The invention claimed is:

1. A method of determining the transmission state of an electrochromic device comprising:
   applying a voltage across said electrochromic device;
   using the applied voltage and current for calculating leakage current of said electrochromic device;
   determining ionic current as the difference between the applied current and the leakage current;
   using the ionic current for determining the transmission state of said electrochromic device.

2. The method as claimed in claim 1, wherein the calculating leakage current step comprises calculating internal voltage of said electrochromic device using the algorithm $$V_{int}=V_{app}-R_s*I_{app}.$$

3. The method as claimed in claim 2, wherein the calculating leakage current step further comprises using the algorithm If $V_{int}=V_T$, $I_{leak}=V_{int}/R_1$, otherwise, $I_{leak}=V_{int}/R_1+(V_{int}-V_T)/R_2$.

4. The method as claimed in claim 3, wherein the determining the transmission state step comprises integrating the ionic current to determine transferred charge ($Q=\int I_{ion}dt$ and correlating the integrated charge to the optical state of said device using the equation % T=f(Q), where f is a mathematical function or look-up table.

5. The method as claimed in claim 4, further comprising:
   applying a holding voltage for maintaining said electrochromic device at a desired transmission level, wherein the holding voltage is greater if said device is fully bleached before being colored to an intermediate state and said holding voltage is less if said device is fully colored before being bleached to the same intermediate state.

6. The method as claimed in claim 5, wherein the applying a holding voltage comprises:
   calculating an internal holding voltage for said device using the bleaching/coloring history of said device; and
   adjusting external voltage applied to said device until the calculated internal voltage, $V_{int}=V_{app}-R_s*I_{app}$, matches the required value.

* * * * *